US011188372B2

(12) United States Patent
Singleton, IV et al.

(10) Patent No.: US 11,188,372 B2
(45) Date of Patent: Nov. 30, 2021

(54) COMPUTING SYSTEM WITH DUAL VDA REGISTRATION AND RELATED METHODS

(71) Applicant: CITRIX SYSTEMS, INC., Fort Lauderdale, FL (US)

(72) Inventors: Leo C. Singleton, IV, Fort Lauderdale, FL (US); Mukund Ingale, Pompano Beach, FL (US); Georgy Momchilov, Parkland, FL (US); Balasubramanian Swaminathan, Parkland, FL (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 289 days.

(21) Appl. No.: 16/396,893

(22) Filed: Apr. 29, 2019

(65) Prior Publication Data
US 2020/0341795 A1    Oct. 29, 2020

(51) Int. Cl.
*G06F 9/455* (2018.01)
*G06F 9/46* (2006.01)
*G06F 9/451* (2018.01)
*G06F 9/50* (2006.01)

(52) U.S. Cl.
CPC .......... *G06F 9/45558* (2013.01); *G06F 9/452* (2018.02); *G06F 9/505* (2013.01); *G06F 9/5072* (2013.01); *G06F 2009/4557* (2013.01); *G06F 2009/45562* (2013.01)

(58) Field of Classification Search
CPC ...... G06F 9/45558; G06F 9/452; G06F 9/505; G06F 9/5072; G06F 2009/4562; G06F 2009/4557
USPC ............................................................. 718/1
See application file for complete search history.

(56) References Cited

U.S. PATENT DOCUMENTS

| 9,176,744 | B2 | 11/2015 | Lee |
| 9,538,345 | B2 | 1/2017 | Sah et al. |
| 10,075,459 | B1 | 9/2018 | Suryanarayanan et al. |
| 10,452,441 | B1* | 10/2019 | Subramanian ... G06Q 10/06313 |
| 2011/0153716 | A1* | 6/2011 | Malakapalli ............ G06F 9/452 |
| | | | 709/203 |

(Continued)

FOREIGN PATENT DOCUMENTS

CN           107193585 A   *  9/2017
WO    WO 2015/179508      11/2015

OTHER PUBLICATIONS

English Translation of CN 107193585 A (Year: 2017).*

(Continued)

*Primary Examiner* — Bradley A Teets
(74) *Attorney, Agent, or Firm* — Allen, Dyer, Doppelt + Gilchrist, PA

(57) ABSTRACT

A computing system may be in communication with client computing devices. The computing system may include a cloud infrastructure, an offline cache, and a VDA configured to concurrently have a first registration with the cloud infrastructure, and a second registration with the offline cache, and provide corresponding virtual desktop instances for the client computing devices based upon either the first registration or the second registration. The offline cache may be configured to broker local resources for the virtual desktop instances when the cloud infrastructure is unavailable. The VDA may be configured to transition to the offline cache using the second registration when the cloud infrastructure is unavailable.

21 Claims, 11 Drawing Sheets

(56) References Cited

U.S. PATENT DOCUMENTS

| | | | |
|---|---|---|---|
| 2011/0153838 A1* | 6/2011 | Belkine | G06F 11/301 709/227 |
| 2011/0153853 A1* | 6/2011 | London | G06F 9/452 709/229 |
| 2011/0185292 A1* | 7/2011 | Chawla | G06F 9/452 715/760 |
| 2012/0304168 A1* | 11/2012 | Raj Seeniraj | G06F 8/38 718/1 |
| 2013/0219468 A1 | 8/2013 | Bell | |
| 2015/0113528 A1* | 4/2015 | Kim | G06F 9/452 718/1 |
| 2015/0150007 A1* | 5/2015 | Belkine | G06F 11/301 718/1 |
| 2015/0212857 A1* | 7/2015 | Beveridge | G06F 9/45533 718/1 |
| 2017/0185437 A1 | 6/2017 | Thomas | |
| 2019/0079640 A1 | 3/2019 | Page et al. | |

OTHER PUBLICATIONS

Jaeman Park et al. "A cache management scheme to support offline environment in cloud system" Cloud Computing Technology and Science (CLOUDCOM), Dec. 3, 2012; pp. 387-392.

U.S. Appl. No. 16/241,047, filed Jan. 7, 2019 Singleton, IV, et al.

\* cited by examiner

COMPUTING SYSTEM WITH DUAL VDA REGISTRATION AND RELATED METHODS

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktop or application sessions, along with additional computing devices to provide management and customer portals for the cloud system.

SUMMARY

Generally, a computing system may be in communication with a plurality of client computing devices. The computing system may include a cloud infrastructure, an offline cache, and a virtual delivery agent (VDA) configured to concurrently have a first registration with the cloud infrastructure, and a second registration with the offline cache, and provide a corresponding plurality of virtual desktop instances for the plurality of client computing devices based upon either the first registration or the second registration. The offline cache may be configured to broker local resources for the plurality of virtual desktop instances when the cloud infrastructure is unavailable. The VDA may be configured to transition to the offline cache using the second registration when the cloud infrastructure is unavailable.

The cloud infrastructure may be configured to broker cloud resources for the plurality of virtual desktop instances when the offline cache is unavailable. The cloud resources may comprise load balancing across a plurality of datacenters, and respective application limits for the plurality of virtual desktop instances, and the local resources may comprise intra-data center load balancing.

In some embodiments, the VDA may be configured to broker VDA resources for the plurality of virtual desktop instances when the offline cache and the cloud infrastructure are unavailable based upon a plurality of connection leases for the plurality of virtual desktop instances. The cloud resources may comprise a first number of resources, the local resources may comprise a second number of resources being less than the first number of resources, and the VDA resources may comprise a third number of resources being less than the second number of resources.

Additionally, the cloud infrastructure and the offline cache may be configured to synchronize a distributed machine state associated with the plurality of virtual desktop instances. The distributed machine state may comprise at least one of a configuration characteristic associated with the plurality of virtual desktop instances, and user session information. At least one of the first registration and the second registration may use a WebSockets communication protocol, for example.

The VDA may be configured to transition to the offline cache using the second registration without a delay. The computing system may also comprise an application storefront in communication between the VDA and the plurality of client computing devices. The offline cache and the VDA may be configured to monitor a plurality of connection quality metrics for the cloud infrastructure. The offline cache and the VDA may be geographically remote to the cloud infrastructure. In some embodiments, the offline cache may comprise a local host cache (LHC).

Another aspect is directed to a method of operating a VDA in a computing system comprising a plurality of client computing devices, a cloud infrastructure, and an offline cache. The method may include concurrently having a first registration with the cloud infrastructure, and a second registration with the offline cache, and providing a corresponding plurality of virtual desktop instances for the plurality of client computing devices based upon either the first registration or the second registration. The method may comprise with the offline cache, brokering local resources for the plurality of virtual desktop instances when the cloud infrastructure is unavailable, and transitioning to the offline cache using the second registration when the cloud infrastructure is unavailable.

Yet another aspect is directed to a non-transitory computer-readable medium for a VDA in a computing system comprising a plurality of client computing devices, a cloud infrastructure, and an offline cache. The non-transitory computer-readable medium has computer-executable instructions for causing the VDA to perform steps comprising concurrently storing a first registration with the cloud infrastructure, and a second registration with the offline cache, and providing a corresponding plurality of virtual desktop instances for the plurality of client computing devices based upon either the first registration or the second registration. The steps may include with the offline cache, brokering local resources for the plurality of virtual desktop instances when the cloud infrastructure is unavailable, and transitioning to the offline cache using the second registration when the cloud infrastructure is unavailable.

DETAILED DESCRIPTION

Figure 1:
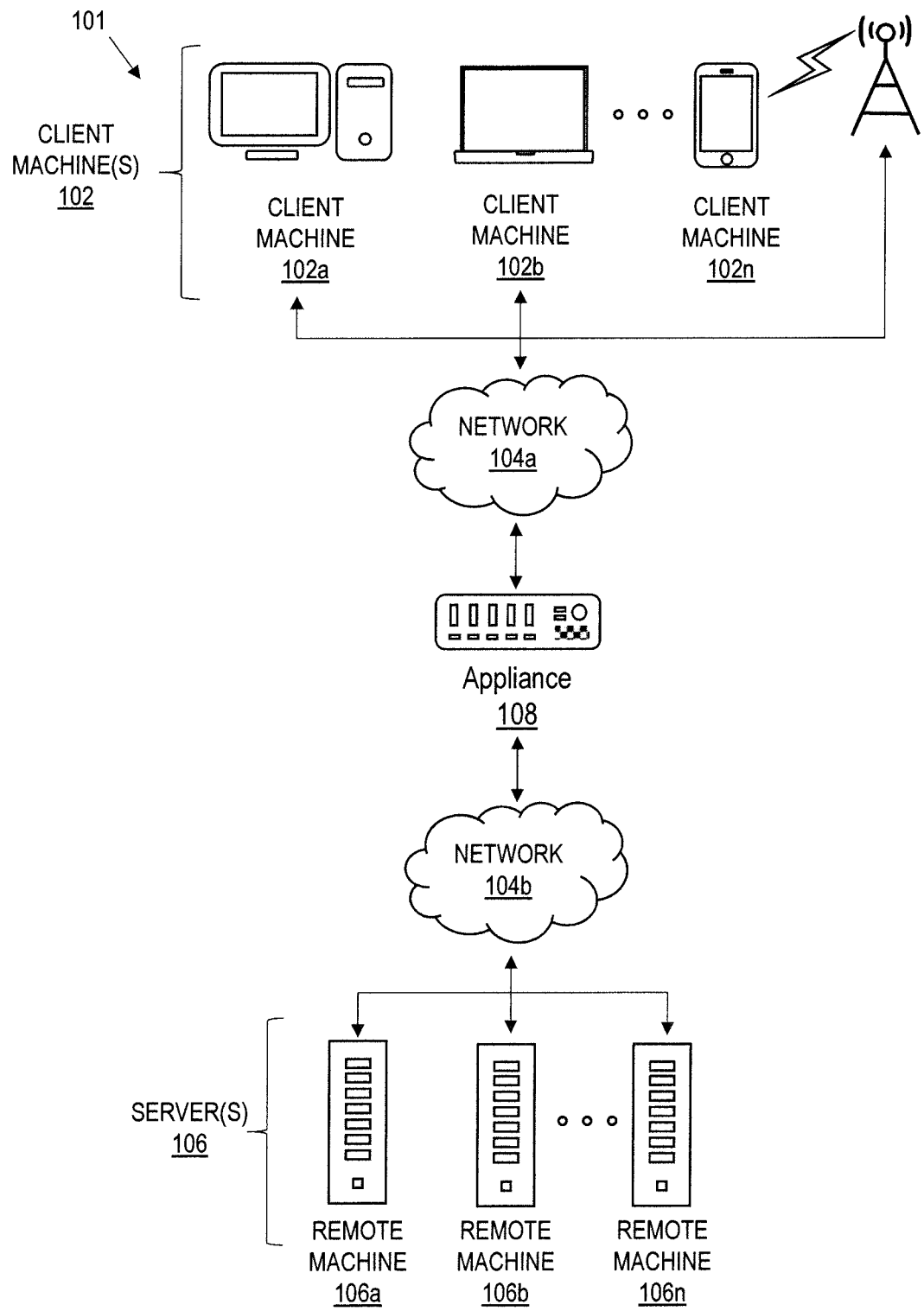
FIG. 1 is a schematic block diagram of a network environment of computing devices in which various aspects of the disclosure may be implemented.

The present description is made with reference to the accompanying drawings, in which example embodiments are shown. However, many different embodiments may be used, and thus the description should not be construed as limited to the particular embodiments set forth herein. Like numbers refer to like elements throughout, and base 100 reference numerals are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, solid-state storage devices, and/or any combination thereof.

Referring initially to FIG. 1, a non-limiting network environment 101 (i.e. a communication system) in which various aspects of the disclosure may be implemented includes one or more client machines 102a-102n, one or more remote machines 106a-106n, one or more networks 104a, 104b, and one or more appliances 108 installed within the computing environment 101. The client machines 102a-102n communicate with the remote machines 106a-106n via the networks 104a, 104b.

In some embodiments, the client machines 102a-102n communicate with the remote machines 106a-106n via an intermediary appliance 108. The illustrated appliance 108 is positioned between the networks 104a, 104b and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104a and/or 104b.

The client machines 102a-102n may be generally referred to as client machines 102, local machines 102, clients 102, client nodes 102, client computers 102, client devices 102, computing devices 102, endpoints 102, or endpoint nodes 102. The remote machines 106a-106n may be generally referred to as servers 106 or a server farm 106. In some embodiments, a client device 102 may have the capacity to function as both a client node seeking access to resources provided by a server 106 and as a server 106 providing access to hosted resources for other client devices 102a-102n. The networks 104a, 104b may be generally referred to as a network. The networks 104a, 104b may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer (SSL) or Transport Layer Security (TLS) Virtual Private Network (VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102. In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104a, 104b may be: a local-area network (LAN); a metropolitan area network (MAN); a wide area network (WAN); a primary public network; and a primary private network. Additional embodiments may include a network 104a, 104b of mobile telephone networks that use various protocols to communicate among mobile devices. For short range communications within a wireless local-area network (WLAN), the protocols may include IEEE 802.11, Bluetooth, and Near Field Communication (NFC).

Figure 2:
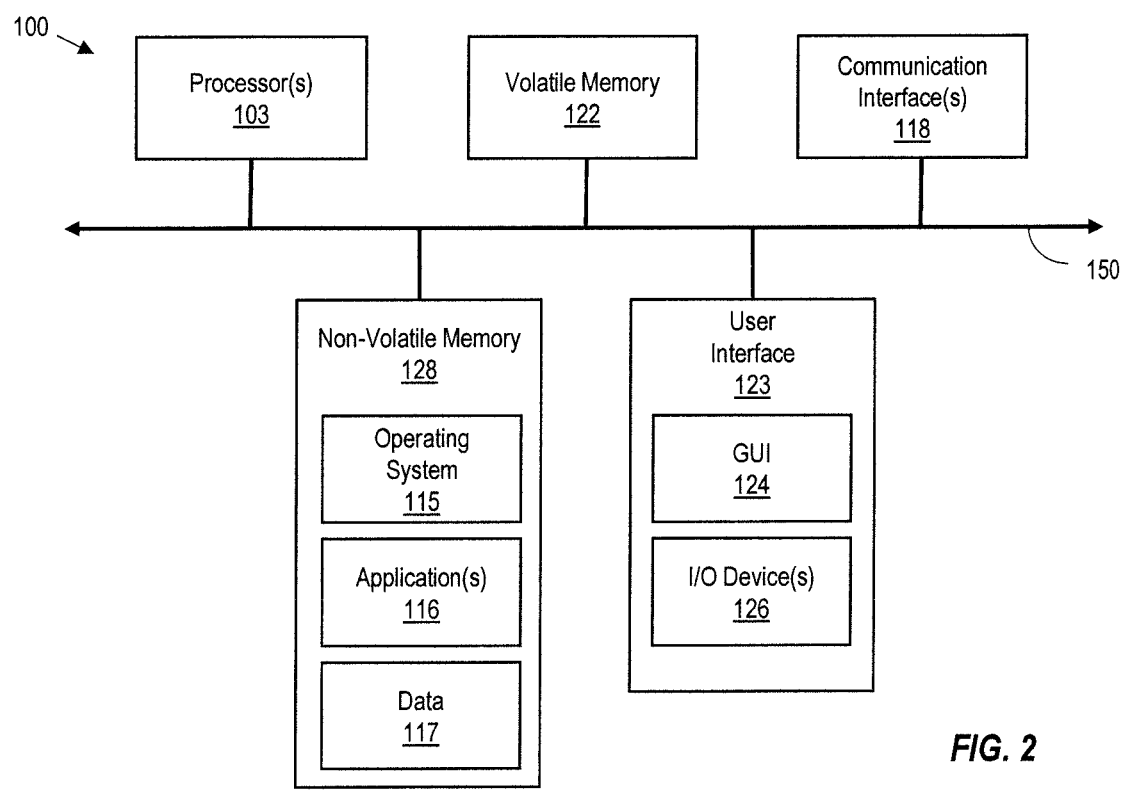
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 127. The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 127.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

By way of background, Citrix XenApp and XenDesktop are products which allow client computing devices to remotely access virtual computing sessions, such as virtual desktop sessions and virtual application sessions. In some embodiments, multiple virtual computing sessions may be hosted by a virtual machine. By way of example, the virtual application sessions may provide access to shared computing applications, including hosted applications, Web/Software as a SaaS applications, etc. Virtual desktop sessions may include both shared applications and hosted operating system components. In the case of XenApp and XenDesktop, a VDA enables connections to the applications and desktops, and is typically installed on the server/machine that runs the XenApp and/or XenDesktop virtual application/desktop sessions for the user (although it may be installed on a different machine in some implementations). The VDA enables the machines to register with delivery controllers and manage the connection to a user device. While the techniques described herein may be implemented using products such as XenApp and XenDesktop, for example, it will be appreciated that they may be implemented using other computing systems as well.

Figure 3:
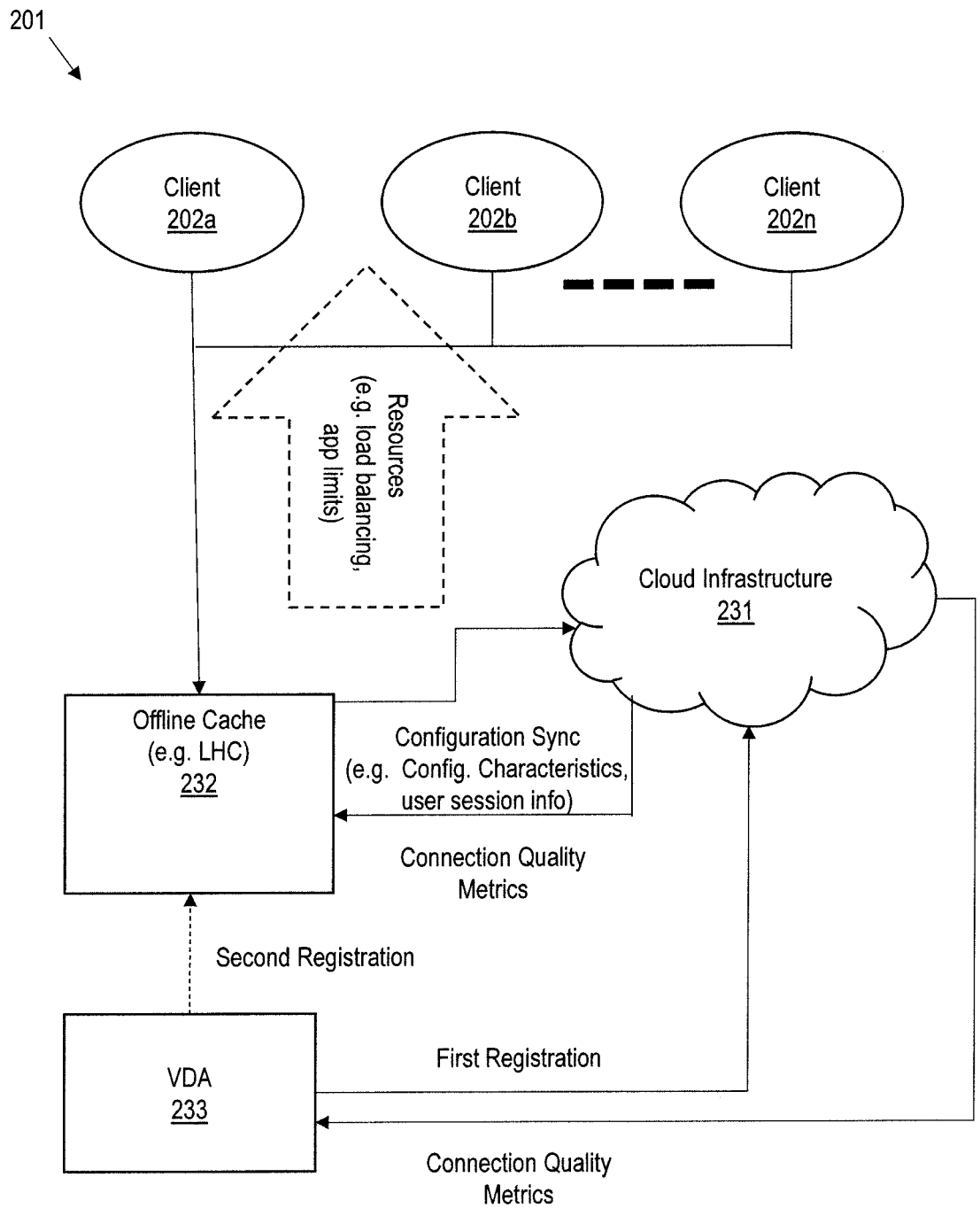
FIG. 3 is a schematic block diagram of a computing system, according to the present disclosure.
Figure 4:
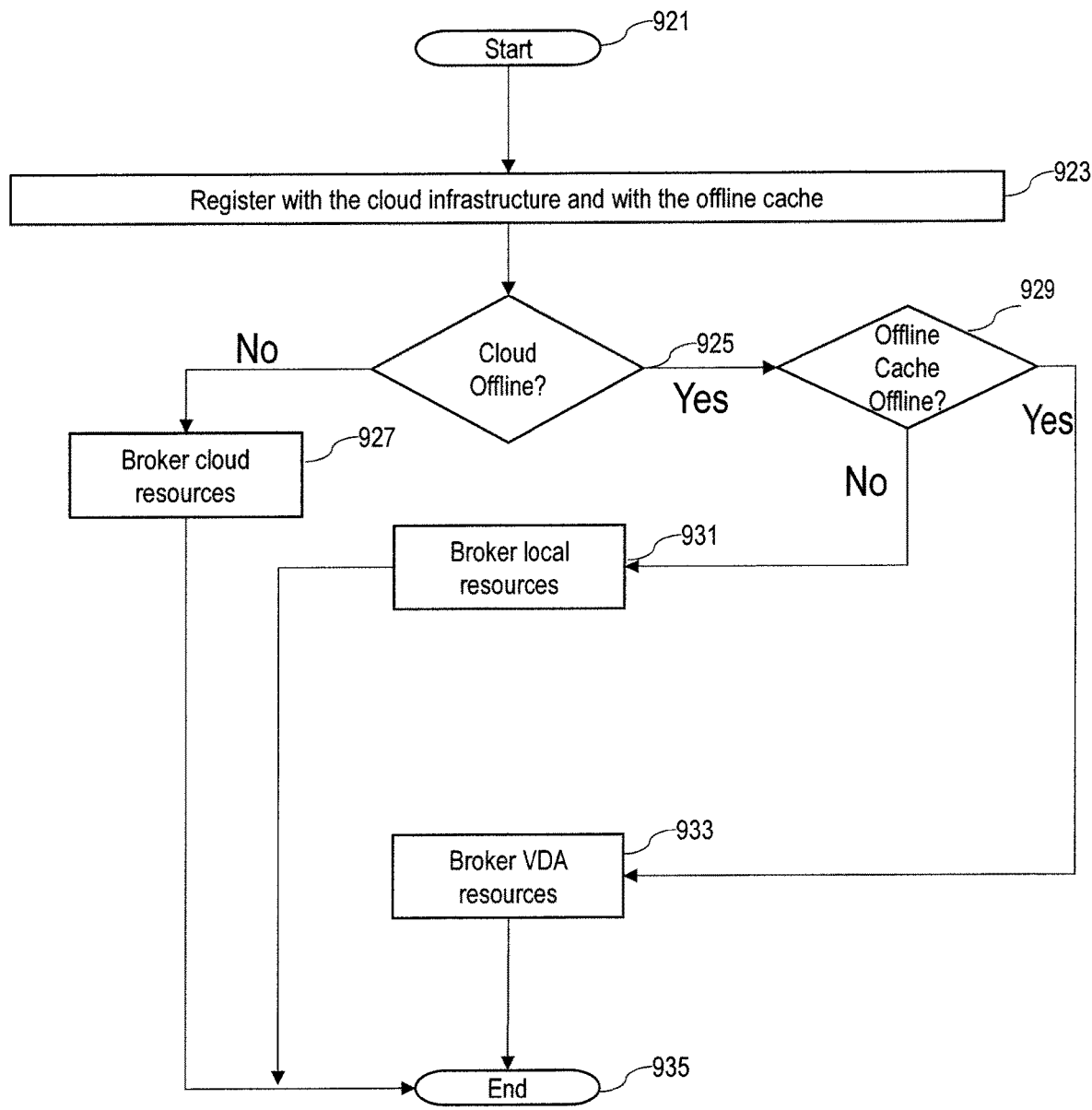
FIGS. 4-5 are flowcharts of a method of operation in the computing system of FIG. 3.

Referring now to FIG. 3, a computing system 201 according to the present disclosure is now described. Also, with reference to FIG. 4, a method for operating the computing system 201 is also described with a flowchart 920. (Block 921).

The computing system 201 illustratively comprises a plurality of client computing devices 202a-202n, a cloud infrastructure 231, an offline cache 232 (e.g. LHC) coupled between the plurality of client computing devices and the cloud infrastructure, and a VDA 233 coupled between the cloud infrastructure and the offline cache. The VDA 233 is configured to broker resources for a corresponding plurality of virtual desktop instances for the plurality of client computing devices 202a-202n.

In some embodiments, the offline cache 232 and the VDA 233 may be geographically remote to the cloud infrastructure 231. In other words, the offline cache 232 and the VDA 233 may be collocated at a local customer. In other embodiments, the offline cache 232 and the VDA 233 may also be geographically remote to each other. In yet other embodiments, the VDA 233 and the cloud infrastructure 231 may be collocated and geographically remote from the offline cache 232. For drawing simplicity, only one VDA and a single plurality of client computing devices 202a-202n are shown, but it should be appreciated that the computing system 201 may include a plurality of VDAs (for a respective plurality of customers) and respective pluralities of client computing devices.

The VDA 233 is configured to concurrently have a first registration with the cloud infrastructure 231, and a second registration with the offline cache 232. (Block 923). At least one of the first registration and the second registration may use a WebSockets communication protocol or a windows communication foundation (WCF) protocol, for example. In other words, the first and second registration may use identical communication protocols in some embodiments (these embodiments being more resilient to domain controller outages) and may use different communication protocols in other embodiments.

The VDA 233 is configured to provide the corresponding plurality of virtual desktop instances for the plurality of client computing devices 202a-202n based upon either the first registration or the second registration. The offline cache 232 and the VDA 233 are configured to monitor a plurality of connection quality metrics for the cloud infrastructure 231. Using the plurality of connection quality metrics, the offline cache 232 and the VDA 233 are configured to determine when the cloud infrastructure 231 is unavailable (e.g. when the cloud infrastructure is down, or when a network connection has degraded).

The offline cache 232 is configured to broker local resources for the plurality of virtual desktop instances when the cloud infrastructure 231 is unavailable. (Blocks 925, 929, 931, 935) The VDA 233 is configured to transition to the offline cache 232 using the second registration when the cloud infrastructure 231 is unavailable. Helpfully, the VDA 233 is configured to transition to the offline cache 232 using the second registration without a delay. In other words, the users of the plurality of client computing devices 202a-202n see no drop in their user experience, and the transition to the second registration is seamless.

By default, the VDA 233 is configured to use the cloud infrastructure 231 and the associated first registration to broker cloud resources for the plurality of virtual desktop instances in a normal operating state. Also, the cloud infrastructure 231 is configured to broker the cloud resources for the plurality of virtual desktop instances when the offline cache 232 is unavailable. Indeed, so long as the cloud infrastructure 231 is available, the cloud infrastructure will broker the cloud resources for the plurality of virtual desktop instances regardless of the state of the offline cache 232. (Blocks 925, 927, 935).

When the cloud infrastructure 231 is unavailable, the VDA 233 falls back to the second registration and the offline cache 232. In further degraded environments, for example, where both the cloud infrastructure 231 and the offline cache 232 are unavailable, the VDA 233 is configured to broker VDA resources for the plurality of virtual desktop instances based upon a plurality of connection leases for the plurality of virtual desktop instances. (Blocks 925, 929, 933, 935).

Connection leasing is a way to provide relatively high availability by authorizing client computing devices to connect to one of many VDAs via a signed lease document. Features related to connection leasing are disclosed in U.S. patent application Ser. No. 16/241,047, which is assigned to the current assignee of the present disclosure, the contents of which are incorporated by reference in their entirety.

As mentioned hereinabove, the VDA 233 coordinating the brokering of the cloud resources via the cloud infrastructure 231 is preferred. The reason for this is that the cloud resources are enhanced (i.e. they have a more global system view) relative to the local resources, and even more so, the VDA resources. In particular, the cloud resources may comprise load balancing across a plurality of datacenters, and respective application limits for the plurality of virtual desktop instances, and the local resources may comprise intra-data center load balancing (i.e. local load balancing). For example, the offline cache 232 may only see a single datacenter. However, during an outage of the cloud infrastructure 231 or a user's internet connection, connections can fall back to the offline cache 232 to avoid a full outage.

Numerically, the cloud resources may comprise a first number of resources, the local resources may comprise a second number of resources being less than the first number of resources, and the VDA resources may comprise a third number of resources being less than the second number of resources. In other words, the computing system 201 may provide for a set of graceful degradation modes as shown in Table 1.

TABLE 1

| Cloud Infrastructure registration state | Local Cache registration state | End user experience |
| --- | --- | --- |
| Registered | Any | Full functionality |
| Unregistered | Registered | Slightly degraded experience<br>Load balancing across datacenters may fail<br>No impact to launch times |
| Unregistered | Unregistered | Major degradation (but not a full outage)<br>Load balancing, application limits, and other features may be unavailable<br>Slower launch times. |

The cloud infrastructure 231 and the offline cache 232 are configured to synchronize a distributed machine state associated with the plurality of virtual desktop instances. The distributed machine state may comprise at least one of a configuration characteristic associated with the plurality of virtual desktop instances, and user session information. For example, when state changes occur on the VDA 233, such as a session disconnect or logoff, the events are sent to both brokers (i.e. the cloud infrastructure 231 and the offline cache 232).

Figure 5:
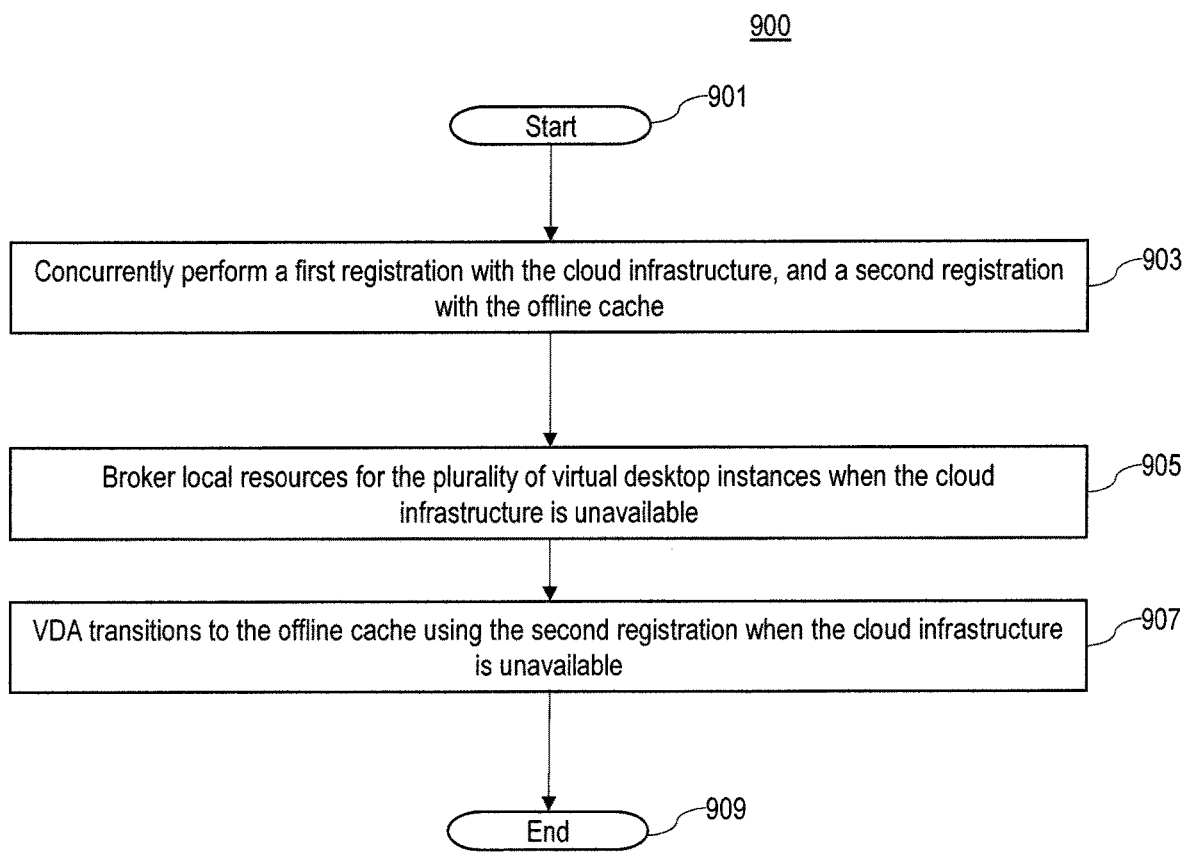

Referring now to FIGS. 3 and 5 (flowchart 900), a method is described for operating a VDA 233 in a computing system 201 comprising a plurality of client computing devices 202a-202n, a cloud infrastructure 231, and an offline cache 232. The method illustratively includes concurrently having a first registration with the cloud infrastructure, and a second registration with the offline cache 232. (Blocks 901, 903). The method illustratively includes providing a corresponding plurality of virtual desktop instances for the plurality of client computing devices 202a-202n based upon either the first registration or the second registration. The method illustratively comprises with the offline cache 232, brokering local resources for the plurality of virtual desktop instances when the cloud infrastructure 231 is unavailable, and transitioning to the offline cache using the second registration when the cloud infrastructure is unavailable. (Blocks 905, 907, 909).

Also, in some applications, a non-transitory computer-readable medium may be configured for the VDA 233 in the computing system 201 comprising the plurality of client computing devices 202a-202n, the cloud infrastructure 231, and the offline cache 232. The non-transitory computer-readable medium has computer-executable instructions for causing the VDA 233 to perform steps of the method described above.

Figure 6A:
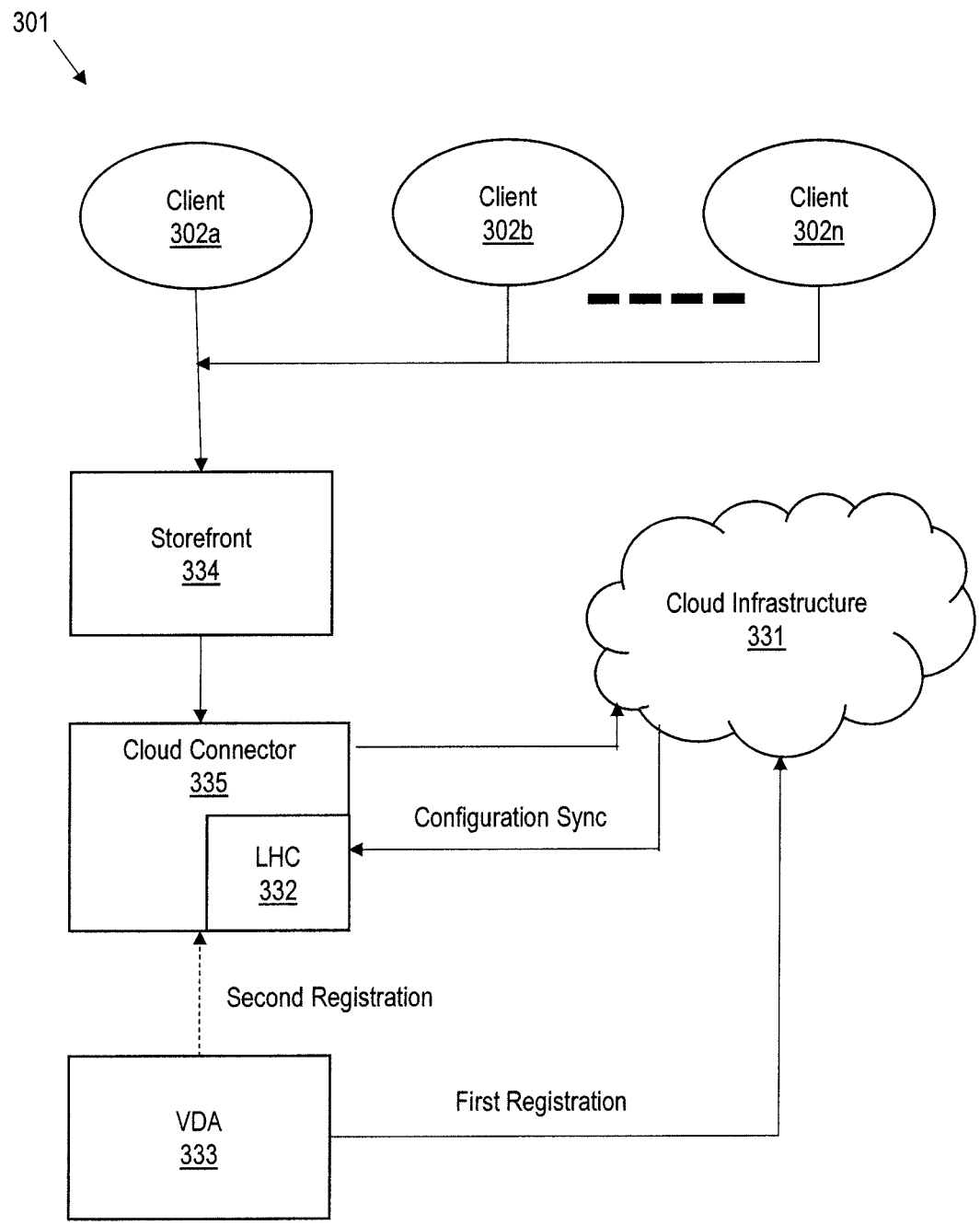
FIGS. 6A-6B are schematic block diagrams of varying states in another embodiment of the computing system, according to the present disclosure.
Figure 6B:
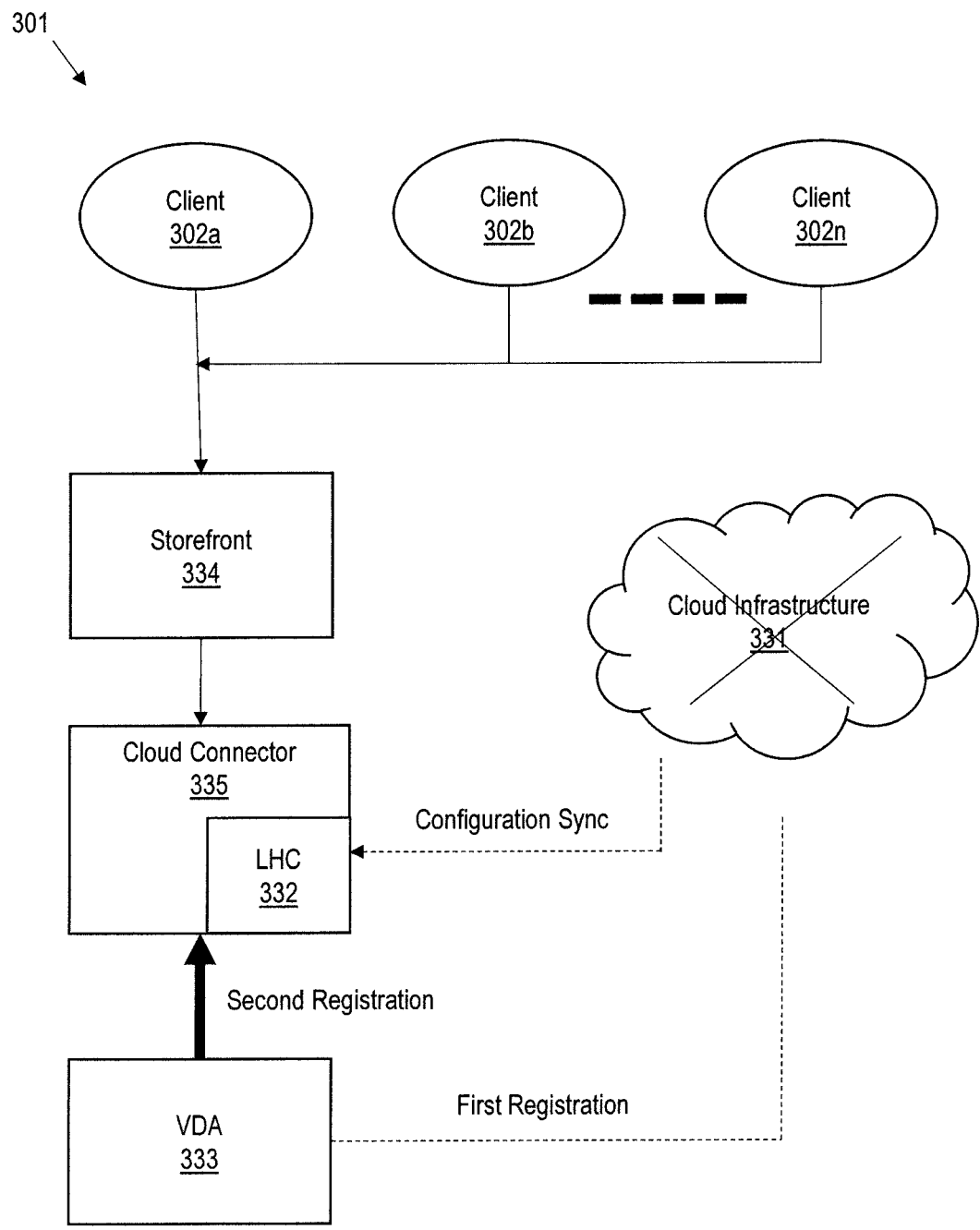

Referring now additionally to FIGS. 6A-6B, another embodiment of the computing system 301 is now described. In this embodiment of the computing system 301, those elements already discussed above with respect to FIGS. 1-5 are incremented by 300 and most require no further discussion herein. This embodiment differs from the previous embodiment in that this computing system 301 illustratively includes an application storefront 334 in communication between the VDA 333 (via an intermediary) and the plurality of client computing devices 302a-302n. Also, the offline cache has been replaced with a cloud connector module 335 including the offline cache, illustrated as an LHC 332. In other words, the VDA has both the first and second registrations with the cloud connector module 335, and the first registration is proxy connected to the cloud infrastructure 331.

In FIG. 6A, a normal operation condition is illustrated. The first registration (i.e. the primary registration) is with the cloud infrastructure 331, and the second registration (i.e. the backup registration) is with the cloud connector module 335 and the LHC 332 therein. The second registration is not active and is shown with dashed lines. Also, as illustrated, the cloud infrastructure 331 is configured to synchronize the configuration parameters between the first and second registrations. Since the first registration is active, the configuration synchronization is largely one way (i.e. the cloud infrastructure 331 sending updates to the LHC 332).

In FIG. 6B, a degraded operation condition is illustrated. Here, the cloud infrastructure 331 has become unavailable. The configuration synchronization and first registration links have become inactive, noted with dashed lines. The second registration link has become active, and the VDA 333 coordinates with the LHC 332 to broker the local resources for the plurality of client computing devices 302a-302n. In this instance, new connections will be routed to the LHC 332. Because the VDA 333 has dual registrations and replicates its state data, there is no transition delay.

Figure 7A:
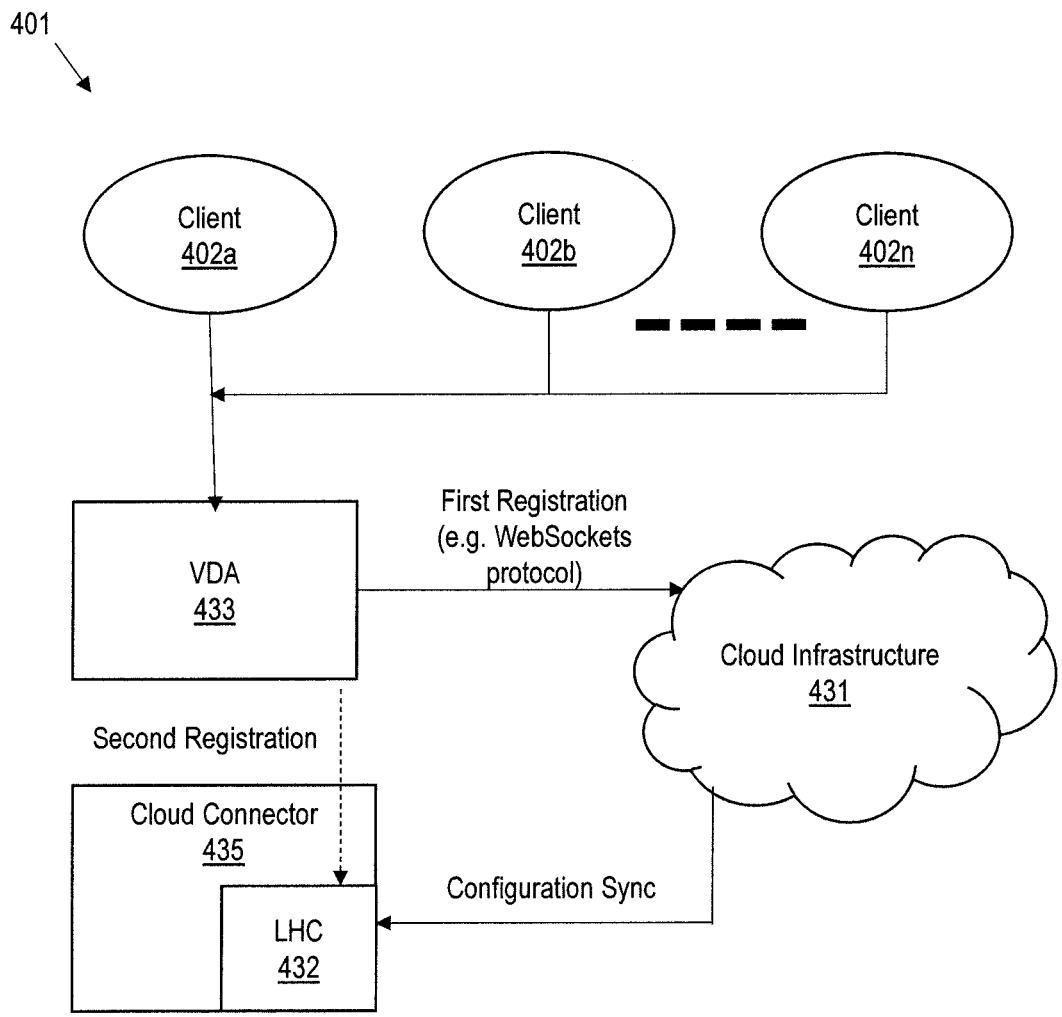
FIGS. 7A-7C are schematic block diagrams of varying states in yet another embodiment of the computing system, according to the present disclosure.
Figure 7B:
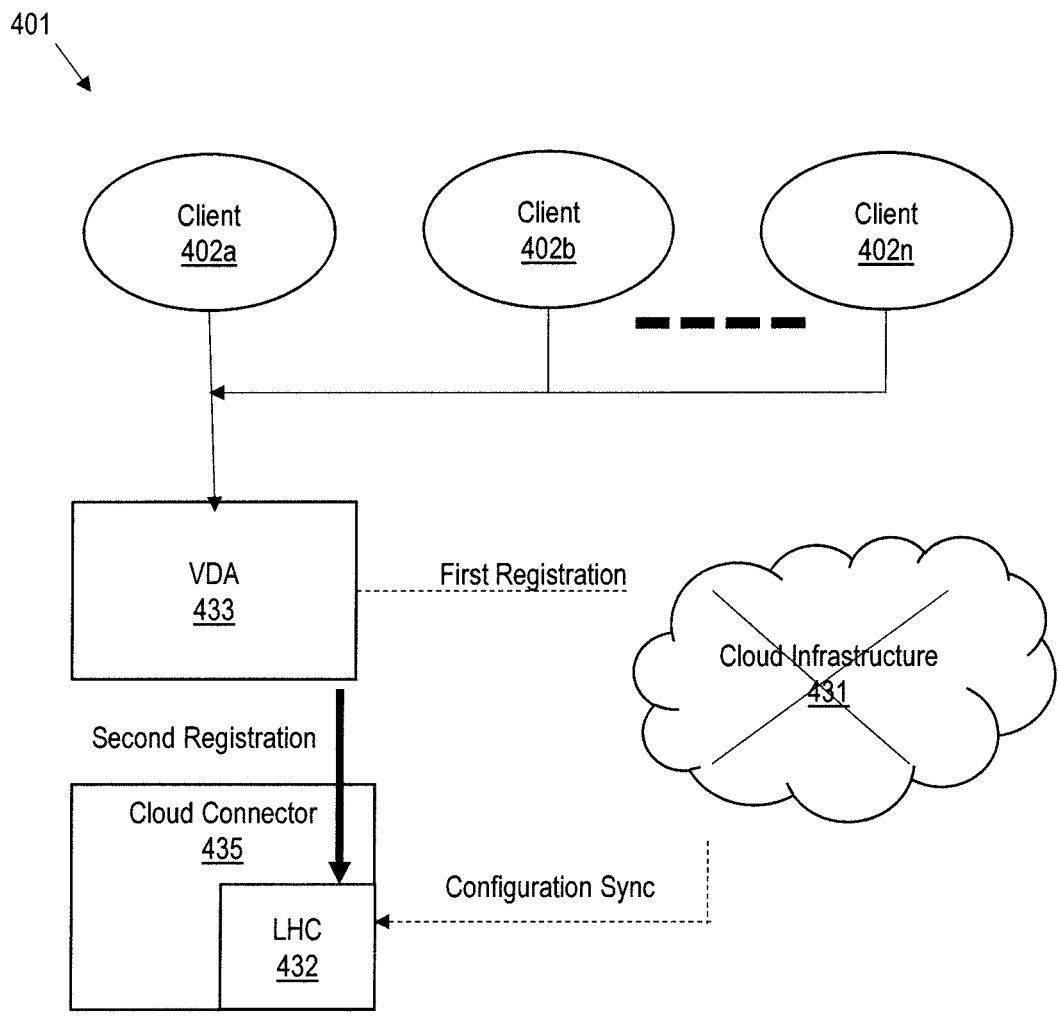
Figure 7C:
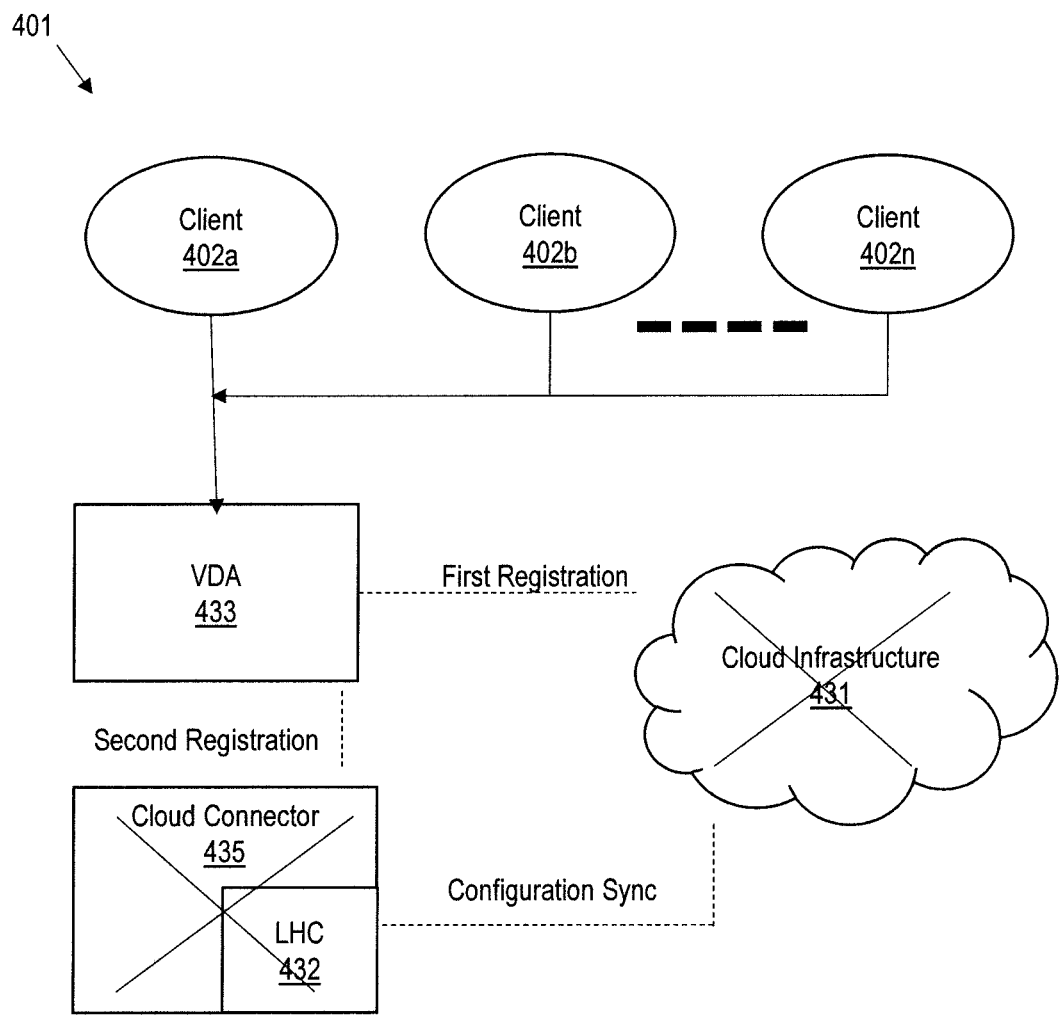

Referring now additionally to FIGS. 7A-7C, another embodiment of the computing system 401 is now described. In this embodiment of the computing system 401, those elements already discussed above with respect to FIGS. 1-6B are incremented by 400 and most require no further discussion herein. This embodiment differs from the previous embodiment in that this computing system 401 illustratively includes the offline cache replaced with a cloud connector module 435 including the offline cache, illustrated as an LHC 432. The application storefront is omitted in this embodiment (from FIGS. 6A-6B), and the plurality of client computing devices 402a-402n communicates with the VDA 433 directly. The direct connection is enabled via connection leasing from the plurality of client computing devices 402a-402n.

In FIG. 7A, a normal operation condition is illustrated. The first registration (i.e. the primary registration) is with the cloud infrastructure 431, and the second registration (i.e. the backup registration) is with the cloud connector module 435 and the LHC 432 therein. The second registration is not active and is shown with dashed lines. Also, as illustrated, the cloud infrastructure 431 is configured to synchronize the configuration parameters between the first and second registrations. Since the first registration is active, the configuration synchronization is largely one way.

In FIG. 7B, a first degraded operation condition is illustrated. Here, the cloud infrastructure 431 has become unavailable. The configuration synchronization and first registration links have become inactive, noted with dashed lines. The second registration link has become active, and the VDA 433 coordinates with the LHC 432 to broker the local resources for the plurality of client computing devices 402a-402n.

In FIG. 7C, a second degraded operation condition (more degraded than the first degraded operation condition) is illustrated. Here, the cloud infrastructure 431 and the cloud connector module 435 (including the LHC 432) have become unavailable. The configuration synchronization, the first registration, and the second registration links have become inactive, noted with dashed lines. In this condition, the VDA 433 is configured to broker VDA resources for the plurality of virtual desktop instances for the respective plurality of client computing devices 402a-402n.

The computing system 201, 301, 401 disclosed herein provides an approach to resolve resiliency and performance issues for systems providing virtual desktop instances for client computing devices. In short, when a customer's access to cloud resources is impaired, in typical approaches, there is limited local redundancy, and the system switches to the limited local redundancy to avoid a complete outage. Problematically, the transition is not seamless for users of virtual desktop instances and there is noticeable delay and/or downtime.

In these typical approaches, the VDA 233, 333, 433 would register either with the cloud infrastructure 231, 331, 431 or with the offline cache 232, 332, 432. In order to switch from one to another, a registration storm occurs and all state information must be recreated, which creates the delay.

Figure 8:
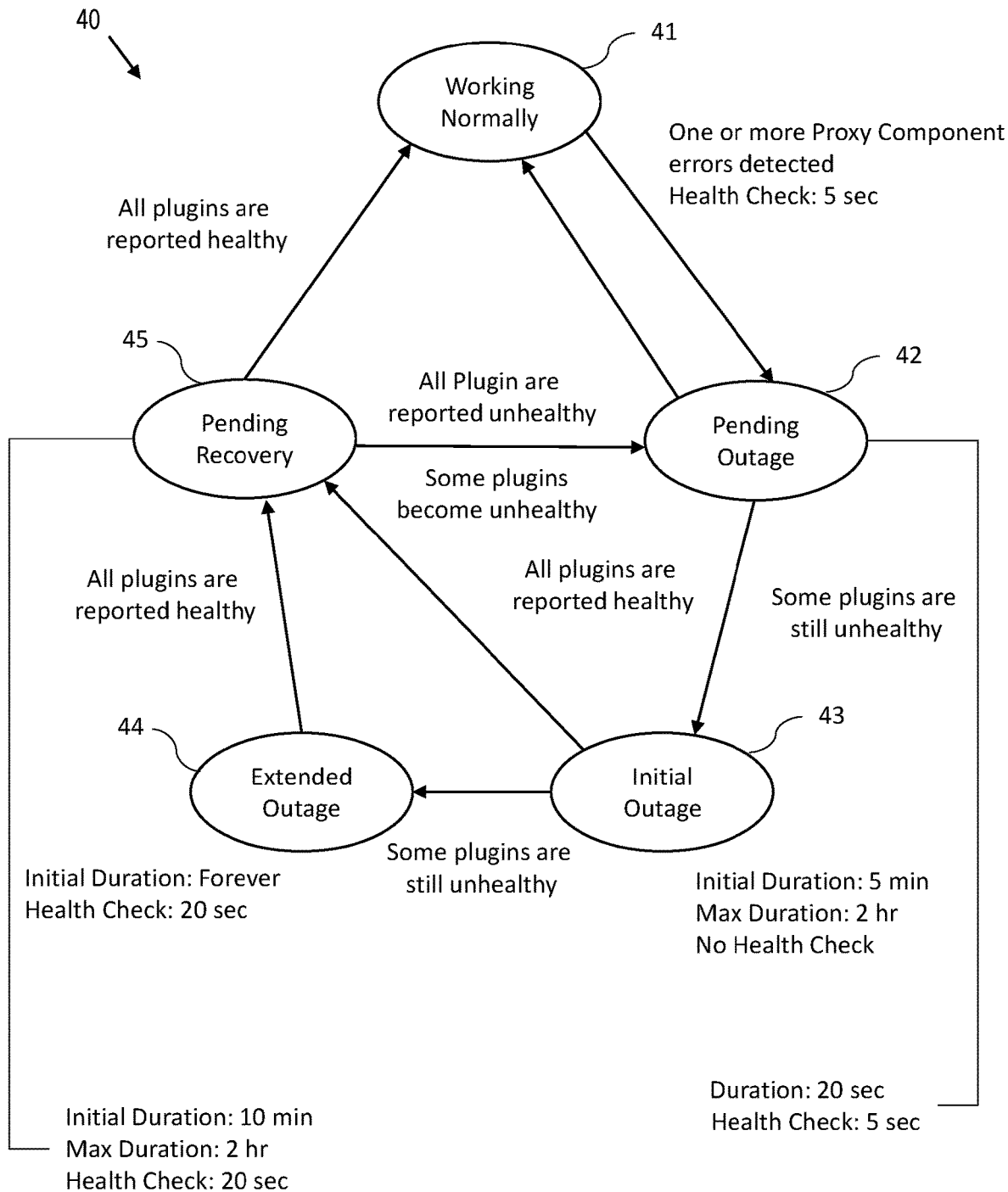
FIG. 8 is a schematic diagram of state transitions in the computing system of FIG. 3.

Referring now additionally to FIG. 8 and a state diagram 40 therein, the cloud connector module 335, 435 can be in one of five illustrated states: working normally state 41, pending outage state 42, initial outage state 43, extended outage state 44, and pending recovery state 45. When transitioning to the initial outage state 43 (in case of network interruption), in typical approaches, the VDA 233, 333, 433 has to re-register with the offline cache 232, 332, 432. The re-registration takes about 3-5 minutes. For launches to work again, the re-registration has to be complete. In other words, during this re-registration process, the plurality of virtual desktop instances would have impaired functionality.

With dual registration of the computing system 201, 301, 401, the VDA 233, 333, 433 is registering with the cloud infrastructure 231, 331, 431 and the offline cache 232, 332, 432. In case of outage, when the brokering responsibilities are transferred to offline cache 232, 332, 432, the re-registration can be avoided hence the launches would be working sooner.

Also, when the network connection is restored, the transition from the pending recovery state 45 to the working normally state 41 requires the cloud connector module 335, 435 to wait in the pending recovery state for 10 minutes. With dual registration of the computing system 201, 301, 401, each VDA 233, 333, 433 will be trying to connect to the cloud connector module 335, 435 when the network is restored hence most of the VDAs would already be registered when the state transitions from the pending recovery state 45 to the working normally state 41. Without dual registration in typical approaches, all VDAs 233, 333, 433 would register with the cloud connector module 335, 435 after the state changes to the working normally state 41, which creates yet another delay for the user.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing system in communication with a plurality of client computing devices, the computing system comprising:
   a cloud infrastructure;
   an offline cache; and
   a virtual delivery agent (VDA) configured to
      concurrently have a first registration with said cloud infrastructure, and a second registration with said offline cache, and
      provide a corresponding plurality of virtual desktop instances for said plurality of client computing devices based upon either the first registration or the second registration;
   said offline cache configured to broker local resources for said plurality of virtual desktop instances when said cloud infrastructure is unavailable;
   said VDA configured to transition to said offline cache using the second registration when said cloud infrastructure is unavailable;
   said VDA configured to broker the local resources for said plurality of virtual desktop instances when said cloud infrastructure and said offline cache are unavailable.

2. The computing system of claim 1 wherein said cloud infrastructure is configured to broker cloud resources for said plurality of virtual desktop instances when said offline cache is unavailable.

3. The computing system of claim 2 wherein the cloud resources comprise load balancing across a plurality of datacenters, and respective application limits for the plurality of virtual desktop instances; and wherein the local resources comprise intra-data center load balancing.

4. The computing system of claim 2 wherein said VDA is configured to broker VDA resources for said plurality of virtual desktop instances when said offline cache and said cloud infrastructure are unavailable based upon a plurality of connection leases for the said plurality of virtual desktop instances.

5. The computing system of claim 4 wherein the cloud resources comprise a first number of resources;
   wherein the local resources comprise a second number of resources being less than the first number of resources; and
   wherein the VDA resources comprise a third number of resources being less than the second number of resources.

6. The computing system of claim 1 wherein said cloud infrastructure and said offline cache are configured to synchronize a distributed machine state associated with said plurality of virtual desktop instances.

7. The computing system of claim 6 wherein said distributed machine state comprises at least one of a configuration characteristic associated with said plurality of virtual desktop instances, and user session information.

8. The computing system of claim 1 wherein at least one of the first registration and the second registration uses a WebSockets communication protocol.

9. The computing system of claim 1 wherein said VDA is configured to transition to said offline cache using the second registration without a delay.

10. The computing system of claim 1 further comprising an application storefront in communication between said VDA and said plurality of client computing devices.

11. The computing system of claim 1 wherein said offline cache and said VDA are configured to monitor a plurality of connection quality metrics for said cloud infrastructure.

12. The computing system of claim 1 wherein said offline cache and said VDA are geographically remote to said cloud infrastructure.

13. The computing system of claim 1 wherein said offline cache comprises a local host cache (LHC).

14. A method of operating a virtual delivery agent (VDA) in a computing system comprising a plurality of client computing devices, a cloud infrastructure, and an offline cache, the method comprising:
   concurrently having a first registration with the cloud infrastructure, and a second registration with the offline cache;
   providing a corresponding plurality of virtual desktop instances for the plurality of client computing devices based upon either the first registration or the second registration;
   with the offline cache, brokering local resources for the plurality of virtual desktop instances when the cloud infrastructure is unavailable;
   transitioning to the offline cache using the second registration when the cloud infrastructure is unavailable; and
   with the VDA, brokering the local resources for the plurality of virtual desktop instances when the cloud infrastructure and the offline cache are unavailable.

15. The method of claim 14 further comprising with the cloud infrastructure, brokering cloud resources for the plurality of virtual desktop instances when the offline cache is unavailable.

16. The method of claim 15 wherein the cloud resources comprise load balancing across a plurality of datacenters, and respective application limits for the plurality of virtual desktop instances; and wherein the local resources comprise intra-data center load balancing.

17. The method of claim 15 further comprising brokering VDA resources for the plurality of virtual desktop instances when the offline cache and the cloud infrastructure are unavailable based upon a plurality of connection leases for the plurality of virtual desktop instances.

18. The method of claim 14 further comprising with the cloud infrastructure and the offline cache, synchronizing a distributed machine state associated with the plurality of virtual desktop instances.

19. A non-transitory computer-readable medium for a virtual delivery agent (VDA) in a computing system comprising a plurality of client computing devices, a cloud infrastructure, and an offline cache, the non-transitory computer-readable medium having computer-executable instructions for causing the VDA to perform steps comprising:
   concurrently storing a first registration with the cloud infrastructure, and a second registration with the offline cache, and providing a corresponding plurality of virtual desktop instances for the plurality of client computing devices based upon either the first registration or the second registration;
   with the offline cache, brokering local resources for the plurality of virtual desktop instances when the cloud infrastructure is unavailable;
   transitioning to the offline cache using the second registration when the cloud infrastructure is unavailable; and
   with the VDA, brokering the local resources for the plurality of virtual desktop instances when the cloud infrastructure and the offline cache are unavailable.

20. The non-transitory computer-readable medium of claim 19 wherein the steps include with the cloud infrastructure, brokering cloud resources for the plurality of virtual desktop instances when the offline cache is unavailable.

21. The non-transitory computer-readable medium of claim 20 wherein the cloud resources comprise load balancing across a plurality of datacenters, and respective application limits for the plurality of virtual desktop instances; and wherein the local resources comprise intra-data center load balancing.

\* \* \* \* \*